United States Patent
Katzer et al.

(10) Patent No.: US 8,200,626 B1
(45) Date of Patent: Jun. 12, 2012

(54) MOBILE DEVICE FILE MANAGEMENT

(75) Inventors: Robin Dale Katzer, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 370 days.

(21) Appl. No.: 12/562,836

(22) Filed: Sep. 18, 2009

(51) Int. Cl.
G06F 17/00 (2006.01)
G06F 15/16 (2006.01)

(52) U.S. Cl. .......... 707/621; 707/618; 709/217

(58) Field of Classification Search .......... 707/618, 707/621; 709/217
See application file for complete search history.

(56) References Cited

U.S. PATENT DOCUMENTS

| | | | | |
|---|---|---|---|---|
| 5,774,717 A * | 6/1998 | Porcaro | | 1/1 |
| 5,925,117 A * | 7/1999 | Kirby et al. | | 710/303 |
| 6,021,413 A * | 2/2000 | Vaduvur et al. | | 1/1 |
| 6,496,979 B1 * | 12/2002 | Chen et al. | | 717/178 |
| 6,549,770 B1 * | 4/2003 | Marran | | 455/419 |
| 6,615,038 B1 * | 9/2003 | Moles et al. | | 455/418 |
| 6,847,983 B2 * | 1/2005 | Somalwar et al. | | 707/624 |
| 6,886,024 B1 * | 4/2005 | Fujita et al. | | 709/201 |
| 6,920,455 B1 * | 7/2005 | Weschler | | 1/1 |
| 7,130,885 B2 * | 10/2006 | Chandra et al. | | 709/206 |
| 7,200,390 B1 * | 4/2007 | Henager et al. | | 455/419 |
| 7,350,205 B2 * | 3/2008 | Ji | | 717/172 |
| 7,734,602 B2 * | 6/2010 | Folkert et al. | | 707/696 |
| 7,788,223 B2 * | 8/2010 | Liu et al. | | 707/618 |
| 7,831,569 B2 * | 11/2010 | Bestgen et al. | | 707/676 |
| 7,836,015 B1 * | 11/2010 | Mills et al. | | 707/613 |
| 7,860,827 B1 * | 12/2010 | Ayyad | | 707/610 |
| 7,890,462 B2 * | 2/2011 | Daum et al. | | 707/620 |
| 7,962,448 B2 * | 6/2011 | Creamer et al. | | 707/611 |
| 7,991,739 B2 * | 8/2011 | Kanevsky et al. | | 707/634 |
| 8,005,927 B2 * | 8/2011 | Apfel et al. | | 709/219 |
| 2002/0138582 A1 * | 9/2002 | Chandra et al. | | 709/206 |
| 2006/0135190 A1 * | 6/2006 | Drouet et al. | | 455/514 |
| 2008/0301231 A1 * | 12/2008 | Mehta et al. | | 709/204 |
| 2009/0069915 A1 * | 3/2009 | Khedouri et al. | | 700/94 |
| 2009/0300578 A1 * | 12/2009 | Neil | | 717/104 |
| 2010/0153943 A1 * | 6/2010 | Chase | | 717/173 |
| 2011/0040727 A1 * | 2/2011 | Golab et al. | | 707/618 |

OTHER PUBLICATIONS

Waluyo, Augustinus Borgy, et al., "Index Dissemination for MultiBroadcast Channel in Mobile Databases", MoMM2003, Jakarta, Indonesia, Sep. 15-17, 2003, pp. 65-74.*
Microsoft Computer Dictionary, 5th Edition, Microsoft Press, Redmond, WA, © 2002, pp. 47-48, 126, 129, 221, 417 and 521.*

* cited by examiner

Primary Examiner — Robert Stevens (57) ABSTRACT

A system is provided for mobile device file management. A client application determines whether a requested file associated with a file identifier is stored in a file system in a mobile device. If the file is not stored in the file system, the client application retrieves the file via over-the-air communication, stores the file with storage information in the file system, and provides the file for presentation on a user interface on the mobile device. If a background application determines that the client application is inactive and that a current time and the storage information indicate to refresh the provided file, the background application retrieves at least apart of a refreshed file via over-the-air communication. If the background application determines that the provided file is not the same version as the refreshed file, the background application stores the refreshed file with refreshed storage information in the file system.

5 Claims, 7 Drawing Sheets

MOBILE DEVICE FILE MANAGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND OF THE INVENTION

A mobile device may respond to a user's request for a file by retrieving the file via over-the-air communication, and presenting the retrieved file, such as a web page associated with a uniform resource locator, to the mobile device user. In anticipation of another request for the retrieved file, the mobile device may store the retrieved file in a file system on the mobile device. When the mobile device receives a new request from the user for a file, the mobile device may determine whether the newly requested file is already stored on the file system in the mobile device. If the newly requested file is already stored in the file system on the mobile device, the mobile device retrieves the stored file from the file system and presents the stored file to the user. However, if the newly requested file is not already stored in the file system on the mobile device, the mobile device may retrieve the new file via over-the-air communication and present the newly retrieved file to the user.

SUMMARY OF THE INVENTION

In some embodiments, a system is provided for mobile device file management. The system includes a processor on a mobile device; a client application, and a background application. The client application, when executed by the processor, receives a request for a file associated with a file identifier. If the file is not stored in the file system, the client application retrieves the file via over-the-air communication, stores the retrieved file with storage information in the file system, and provides the stored file for presentation on a user interface on the mobile device. If the client application is inactive and the current time and the storage information indicate to refresh the provided file, the background application retrieves at least a part of a refreshed file via over-the-air communication. If the provided file is not the same version as the refreshed file, the background application stores the refreshed file with refreshed storage information in the file system.

In some embodiments, a computer implemented method is provided for mobile device file management. A client application receives a request for a file associated with a file identifier. If the file is not stored in the file system, the client application retrieves the file via over-the-air communication, stores the retrieved file with storage information in the file system, and provides the stored file for presentation on a user interface on the mobile device. If the client application is inactive and the current time and the storage information indicate to refresh the provided file, at least a part of a refreshed file is retrieved via over-the-air communication. If the provided file is not the same version as the refreshed file, the refreshed file is stored with refreshed storage information in the file system.

In some embodiments, a system is provided for mobile device file management. The system includes a processor on a mobile device, a client application, and a background application. The client application, when executed by the processor, receives a request for a file associated with a first file identifier, and retrieves the file via over-the-air communication if the file is not stored in the file system. The client application parses the retrieved file to identify a dependent file associated with a second file identifier, and retrieves the dependent file via over-the-air communication. The client application stores the retrieved file and the retrieved dependent file with storage information in the file system, and provides the stored file that includes the stored dependent file for presentation on a user interface on the mobile device. The client application creates a file index that references the provided file and the provided dependent file in the file system and a relationship index that references the provided file and the provided dependent file in the file system and comprises a relationship between the provided file and the provided dependent file. If the client application is inactive, and the current time and the storage information indicate to delete the provided file, the background application deletes the provided file from the relationship index. The background application also deletes any files absent from the relationship index from the file index and the file system.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A requested file associated with a file identifier, for example a uniform resource locator, may embed another file which is associated with another file identifier. While a uniform resource locator is provided as an example of a file identifier in several places in the following detailed description, it is contemplated that other references to files or addresses of files or identifications of files are also amenable to the practicing of the several embodiments. The requested file may be referred to as a parent file and the embedded file may be referred to as a dependent file. For example, a web page that includes static information about a television news program may also include a uniform resource locator for another file that provides updates of the score of an ongoing basketball game. In another example, a web page that includes a text article about a basketball game may also include dependent files that provide images of the basketball game. A mobile device that requests the web page may parse the web page, identify the uniform resource locator for the dependent file, request the dependent file, and combine the web page and the dependent file for presentation to the user. When a mobile device user requests a file, such as the web page that updates the score of the basketball game, the mobile device may initially present the web page stored one hour ago when the user first requested the web page, such that the user may need to manually request for the web page to be refreshed to be presented with updated information.

The mobile device may have a limited memory, such that the file system in the mobile device may have the capability to store only a limited number of files requested by the user. The user may not want the mobile device to store some requested files in the file system for an extended period of time. For example, the user may not want the mobile device to store the web page that updates the score of the basketball game in the file system for more than a day because one day after the basketball game is over the web page is no longer updating the score. Additionally, storing the web page that updated the score of yesterday's basketball game in the file system for more than a day may eventually result in the limited memory of the file system no longer storing a file that the user requested one week ago even if the user prefers to retain the file requested a week ago instead of the web page that updated the score for yesterday's basketball game.

Embodiments of the present disclosure provide systems and methods for mobile device file management. A client application on the mobile device receives a request for a file associated with a first file identifier, and retrieves the file via over-the-air communication if the file is not stored in the file system. The client application may parse the retrieved file to identify any dependent files associated with additional file identifiers and retrieve any dependent files via over-the-air communication. The client application stores the retrieved file and any retrieved dependent files with storage information in the file system, and provides the stored file and any stored dependent files for presentation on a user interface on the mobile device. The storage information may specify time periods to store each of the retrieved files and whether to refresh each of the stored files or to delete each of the stored files after the time period expires.

The client application may also create a file index that references the provided file and the provided dependent file in the file system and create a relationship index that references the provided file and the provided dependent file in the file system and includes a relationship between the provided file and the provided dependent file. If the client application is inactive, and the current time and the storage information indicate to refresh any stored files, a background application may retrieve parts of a refreshed file and any refreshed dependent files via over-the-air communication. If an examination of the part of the refreshed files indicates that the refreshed files are newer versions of the stored files, the background application may retrieve the entire files and stores the refreshed files with refreshed storage information in the file system. If the client application is inactive, and the current time and the storage information indicate to delete any stored files, the background application deletes the stored files indicated for deletion from the relationship index.

When the background application has finished managing the entries in the relationship index, the background application deletes any files absent from the relationship index from the file index and the file system. The background application can maintain updated files and delete unwanted files by refreshing stored files that should be refreshed based on the storage information and deleting stored files that should be deleted based on the storage information. By processing dependent files separately from their parent files, the background application does not need to parse the parent files to determine which dependent files to refresh or delete, thereby quickly managing files.

Figure 1:
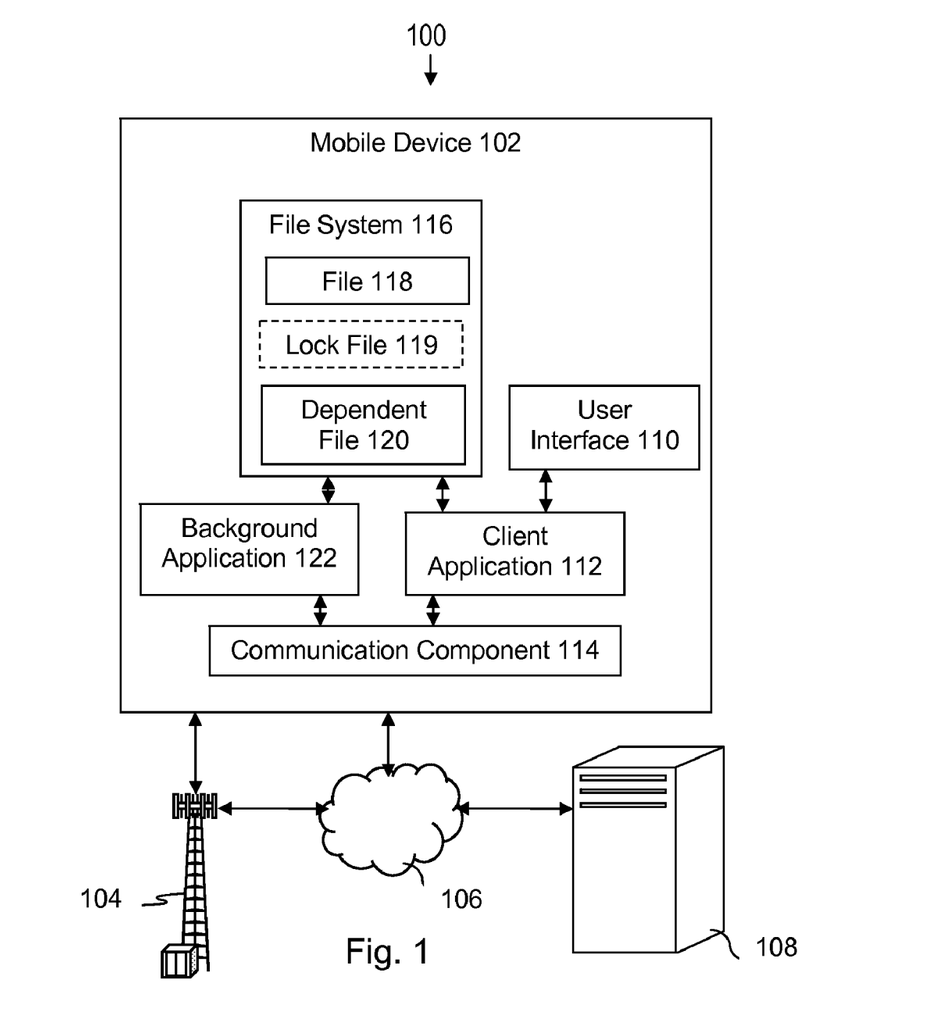
FIG. 1 illustrates a system for mobile device file management according to some embodiments of the present disclosure.

Turning now to FIG. 1, a diagram of a system 100 for mobile device file management is depicted according to embodiments of the present disclosure. The system 100 includes a mobile device 102, a base transceiver station 104, a communication network 106, and a server 108. The mobile device 102 may communicate with the server 108 via the base transceiver station 104 and the communication network 106. The mobile device 102 may communicate by a radio access network providing access to the communication network 106. Other communication paths may also be used.

In an embodiment, the mobile device 102 includes a user interface 110, a client application 112, a communication component 114, and a file system 116. When a mobile device user submits a request for a file via the user interface 110, the client application 112 may receive the request and retrieve the requested file via over-the-air communication using the communication component 114, and present the retrieved file to the user via the user interface 110. The communication component 114 may be a web browser, an e-mail application, a text message application, or any similar communication application. In anticipation of another request for the retrieved file, in an embodiment, the client application 112 may store the retrieved file in the file system 116. In another embodiment, however, the retrieved file may be stored outside of the file system 116 or in some other type of storage structure, such as a memory or a database. In FIG. 1, the file system 116 is depicted as storing a file 118 and a dependent file 120, but the file system 116 may store any number and any types of the files 118, 120. In an embodiment, the file system 116 may be stored at least partially in cache, which is computer memory with short access time used for storage of frequently or recently used instructions or data. In another embodiment, however, the file system 116 may be stored in ordinary memory.

Embodiments of the present disclosure include a background application 122 in the mobile device 102. Each of the applications 112 and 122 may be embodied as software applications, firmware applications, or combinations thereof that are stored in a memory on the mobile device 102, loaded by the mobile device 102, and executed by the mobile device 102. Furthermore, each of the applications 112 and 122 also may be embodied by a combination of software, firmware, and hardware on the mobile device 102. The applications 112 and 122 may be implemented separately as independent services or as part of an independent service that combines the functions of the applications 112 and 122. Those of skill in the art will recognize other examples of how to implement the applications 112 and 122. The applications 112 and 122 may access the file system 116 directly or indirectly through a framework, such as a cache framework. The number and the types of mobile devices 102, base transceiver stations 104, networks 106, servers 108, and mobile device components 110-122 in FIG. 1 are exemplary.

The client application 112 receives a request for a file associated with a file identifier, for example a uniform resource locator, and retrieves the file via over-the-air communication if the file is not stored in the file system 116. A file identifier may be a name of a file, an address of a file, a uniform resource locator of a file, a reference to a file, or another identification of a file. The client application 112 may parse the retrieved file to identify any dependent files associated with additional file identifiers, for example uniform resource locators, and retrieve any dependent files via over-the-air communication. The client application 112 stores the retrieved file and any retrieved dependent files with storage information in the file system 116, and provides the stored file and any stored dependent files for presentation on the user interface 110. For example, the retrieved file may be a web page that includes static information about a television news program, and the web page may also include file identifiers for a file that provides updates of the score of an ongoing basketball game and another file that provides updates of the score of an ongoing baseball game.

The storage information may specify a time period to store each of the retrieved files and whether to refresh each of the stored files or to delete each of the stored files after the time period expires. The time period may specify the amount of time for the file to be stored in the file system after the time that the retrieved file is initially stored and/or after the time that the stored file is provided for presentation. For example, the time period may specify that the retrieved file is stored for three days after the file is stored or one day after the stored file is accessed, whichever time comes later. Therefore, if a file is retrieved and stored on Monday morning, the file would be stored until Thursday morning, but if the user requests the stored file on Wednesday afternoon, the file will now be stored until Thursday afternoon. The storage information may be based on default storage information, a user selection, a frequency associated with how often the provided file is provided for presentation, and an analysis of a website associated with the file identifier, for example the uniform resource locator. For example, all stored files may have a standard period of time for storage unless otherwise specified. In another example, a user may input selections via the user interface 110 for shorter or longer storage periods for specific files or types of files either before the specific files are requested or after the specific files or types of files are presented. In yet another example, the client application 112 may set the storage period for a file at two hours if the user frequently requests the file every two hours. In a further example, the client application 112 may analyze the websites that update the basketball scores and the baseball scores every five minutes and set the storage time for the dependent files that update the basketball score and the baseball scores based on this update frequency.

The client application 112 may create a file index that references the stored file and any stored dependent files in the file system 116. For example, the file index includes a first entry for the web page that includes static information about the television news program, a second entry for the file that provides updates of the score of the ongoing basketball game, and a third entry for the file that provides updates of the score of the ongoing baseball game. The client application 112 also may create a relationship index that references the stored file and the stored dependent files in the file system 116 and includes a relationship between the stored file and any stored dependent files. For example, the relationship index may include not only the same information as the file index entries, but also additional information, such as information for the first entry that identifies the television news file as a parent file for the second and third entries and information for the second and third entries that identify the score update files as dependent files based on the television news file. The relationship index also may store the storage information for each of the stored files. The client application 112 uses the file index to store retrieved files in the file system 116 and to retrieve stored files from the file system 116. The background application 122 uses the relationship index to determine whether to refresh or delete files stored in the file system 116.

The client application 112 may delete a selected file from the file system 116 based on a user selection. For example, an email application may retrieve and store only the 50 most recent emails in the file system 116, but the user may have read the 50 most recent emails from the user's desktop computer and the user may want to read some of the older emails via the mobile device 102. For this example, the user may input selections via the user interface 110 to delete the 50 most recent emails from the file system 116, such that the email application may retrieve and store older emails that the user wants to read via the mobile device 102. Similarly, the user may input selections via the user interface 110 to delete the 10 most recent news articles from the file system 116, such that a news article application may retrieve and store older news articles that the user wants to read via the mobile device 102.

The background application 122 executes in background on the mobile device 102 in order to not take away resources needed by the client application 112 or reduce response time by the client application 112. The background application 122 may execute occasionally based on a default frequency, a user selection, a frequency associated with how often a stored file is provided for presentation, and/or an analysis of a website associated with the file identifier, for example the uniform resource locator. For example, the background application 122 may default to executing every 20 minutes. In another example, the user may select via the user interface 110 for the background application to execute every 15 minutes. In yet another example, the background application 122 may execute every 10 minutes if the user is requesting files more frequently than every 15 minutes. In a further example, the background application 122 may execute every 5 minutes while the files for updating the basketball score and the baseball score are providing updated scores every 5 minutes.

The background application 122 may check a lock file 119 before the background application 122 executes. The client application 112 may create the lock file 119 along with a time and date stamp of the lock file 119, if the lock file 119 does not exist, or update the time date stamp of the lock file 119, if the lock file 119 does exist, when the client application 112 accesses the file system or a URL, for example via a call to a cache layer. Every additional time the client application 112 accesses the file system or a URL, the client application may again update the time date stamp of the lock file 119. In an embodiment, the cache layer may be responsible for updating access data associated with the file system, for example index values. The cache layer may update these indices later, after the client application 112 has completed executing, whereby the functionality of the client application 112 is not degraded, for example so that speed of access to content is not reduced. In practice, some period of time may be needed, after the client application 112 has stopped accessing the file system and/or external content, for the cache layer to update all the indices.

The background application 122 may proceed on the assumption that the indices have been updated if the lock file 119 time date stamp is older than a predefined period of time, for example more than 10 minutes old, more than 15 minutes old, more than 20 minutes old, or more than some other period of time old effective to permit the cache layer to update the indices. If the lock file 119 time date stamp is not older than the predefined period of time, the background application 122 will stop executing, for example stopping execution temporarily. In an embodiment, the background application 122 may execute periodically, for example every 20 minutes or some other period.

In an embodiment, the background application 122 may check to make sure that other mobile device applications are inactive before the background application 122 executes. These applications, which are not shown on the mobile device 102, may include email, gaming, or organizer applications. The background application 122 may check the lock file 119 one or more times while the background application 122 is executing, such that if the client application 112 executes concurrently with the background application 122 and updates the lock file 119, the background application 122 stops executing immediately. In an embodiment, the background application 122 may check the lock file 119 periodically while the background application 122 is executing. In an embodiment, the background application 122 deletes the lock file 119, when it exists, when the background application 122 exits. In some embodiments, the background application 122 may also delete the lock file 119 upon beginning to examine the file system and/or the indices. In another embodiment, the background application 122 may not delete the lock file 119 when the background application 122 exits. In another embodiment, the background application 122 may further update the time and date stamp of the lock file 119 when the background application 122 exits, which may be referred to as resetting the lock file 119 and/or resetting the time and date stamp of the lock file 119.

If the background application 122 determines that the current time and the storage information indicate to refresh any stored files, the background application 122 retrieves at least a part or parts of a refreshed file and any refreshed dependent files via over-the-air communication. The background application 122 may determine whether to refresh a stored file based on whether a refresh selection is set to refresh and whether the current time is greater than a lifespan amount added to the time that the retrieved file is stored and/or the time that the stored file is provided for presentation. For example, if the lifespan amount is set to 24 hours for a stored file, the current time is more than 24 hours since the stored file was stored and since the stored file was accessed, and the refresh selection is set to refresh for the stored file, then the background application 122 refreshes the stored file. The user may set the refresh selection to reset for stored files that the user anticipates requesting again soon.

The background application 122 may retrieve at least a part or parts of the refreshed file and any refreshed dependent files via the over-the-air communication and the communication component 114 based on accessing the relationship index. For example, the background application 122 accesses the relationship index and determines to refresh a stored file for the web page that includes static information about the television news program based on storage information for the stored file that is stored in the relationship index. Because the relationship index indicates that the files that provide updates of the basketball and baseball scores are dependent files for the stored file that the background application 122 is about to refresh, the background application 122 may retrieve at least parts of the refreshed files for the parent file and the dependent file without independently evaluating whether or not to refresh the dependent files, thereby saving time and resources.

If the background application 122 determines that the client application 112 is inactive and that the current time and the storage information indicate to delete a stored file and any stored dependent files based on accessing the relationship index, the background application 122 deletes the stored file and any stored dependent files based on the stored file. The background application 122 deletes the stored file from the relationship index, which is used as the basis for deleting entries from the file index and files from the file system 116. When the background application 122 completes the determination whether to refresh or delete each of the files listed as entries in the relationship index, the background application 122 deletes any files absent from the relationship index from the file index and the file system 116. The background application 122 waits until it is complete with the refresh or delete determination for all of the entries in the relationship index before deleting any entries from the file index or any files from the file system 116. In this manner, the background application 122 minimizes the time period during which the client application 112 may set the lock file 119 and stop execution of the background application while the background application 122 is deleting entries from the file index or files from the file system 116.

The background application 122 may determine whether to delete stored files in a similar manner to the determination made to refresh stored files, except that the refresh selection for a stored file may be set to delete instead of refresh. For example, if the lifespan amount is set to 24 hours for a stored file, the current time is more than 24 hours since the stored file was stored and since the stored file was accessed, and the refresh selection is set to delete for the stored file, then the background application 122 deletes the stored file. Continuing this example, when the background application 122 determines to delete the stored file for the web page that includes static information about the television news program, the background application 122 accesses other storage information for this stored file from the relationship index. Because the relationship index indicates that the files that provide updates of the basketball and baseball scores are dependent files for the stored file that the background application 122 is about to delete, the background application 122 may delete the stored dependent files without independently evaluating whether or not to delete the stored dependent files, thereby saving time and resources. In another example, the background application 122 may delete the stored dependent files only after independently evaluating whether or not to delete the stored dependent files, because the stored dependent files may be dependent upon multiple parent files, such as a parent file to be deleted and a parent file to be refreshed. The user may set the refresh selection to delete for stored files that the user does not anticipate requesting again soon. If the user subsequently requests the deleted file, the client application 112 retrieves a refreshed copy of the deleted file because the client application 112 cannot locate the deleted file in the file system 116.

When the background application 122 begins the process of retrieving at least a part of a refreshed file, the background application 122 determines whether the file to be used for refreshing the stored files is a newer version of the stored file. For example, the background application 122 may compare a timestamp associated with the stored file to a time stamp associated with the file accessed via over-the-air communication to determine whether the stored file is the same version as the file to be used for refreshing. Because the background application 122 may access a timestamp and/or any other meta-data that may be used to identify the version of a file to be used for refreshing before the entire file is actually retrieved, the background application 122 does not have to actually retrieve the entire file if the background application 122 determines that the file to be used for refreshing is the same version as the already stored file.

If the file to be used for refreshing is the same version as the stored file, the background application 122 does not need to retrieve the entire file, but may update the storage information for the stored file instead. For example, if a file is retrieved and stored on Monday morning with a lifespan amount set to 72 hours and a refresh selection set to refresh, on Thursday morning the background application 122 determines whether to refresh the stored file. If the background application 122 communicates via over-the-air communication and determines that the timestamp of the current file accessed via the file identifier is the same timestamp as the stored file, the background application 122 does not retrieve the entire file via over-the-air communication. However, the background application 122 sets the access time for the stored file to Thursday morning, because the background application 122 confirmed that the stored file was current on Thursday morning. Therefore, the stored file is effectively updated or refreshed on Thursday morning, the background application 122 does not spend the time and resources required to retrieve the entire refreshed file, and the background application 122 will subsequently determine whether the stored file needs to be refreshed based on the storage information that reflects the Thursday morning confirmation of an updated file.

If the stored file is not the same version as the file to be used for refreshing, the background application 122 retrieves and stores the entire refreshed file with refreshed storage information in the file system 116. In this example, on Thursday morning the background application determines that the file to be used for refreshing is a different version of the stored file, retrieves the entire file via over-the-air communication, and stores the retrieved file in the file system 116 with storage information that includes the storage date and time for Thursday morning. If the relationship index indicates that the stored file is a parent file that has dependent files, the background application 122 may delete the stored dependent files, parse the retrieved file to determine if the retrieved file is a parent file that has any dependent files, and retrieve any dependent files based on the retrieved parent file. If the one stored file and the two stored dependent files were listed in the relationship index as the first three entries out of twenty entries, and the one retrieved file has three retrieved dependent files, the background application 122 may use entries twenty-one to twenty-four for the retrieved files. Alternatively, the background application 122 may use entries one, two, three, and twenty-one for the four retrieved files to save space in the relationship index. Separating the dependent files from the parent file sequentially in the relationship index is possible because each dependent file has a reference to its parent file and each parent file has a reference to each of its dependent files. The background application 122 will subsequently determine whether the newly stored file needs to be refreshed based on the storage information that reflects the Thursday morning retrieval and storage of the updated file.

If the stored file is not the same version as the file to be used for refreshing, the background application 122 may selectively refresh dependent files. For example, if the stored file is a parent file that had five stored dependent files, and the file to be used for refreshing is a parent file that has five dependent files, the background application 122 may determine whether the stored dependent files are not the same versions as the dependent files to be used for refreshing. The background application 122 may determine whether the stored dependent files are not the same versions as the dependent files to be used for refreshing in a similar manner used for determining whether any stored file is the same version as a file to be used for refreshing. Continuing this example, three of the five stored dependent files may be the same versions as three of the five dependent files to be used for refreshing. In this situation, the background application 122 may delete only the two stored dependent files that are different versions than the dependent files to be used for refreshing, and may retrieve only two of the five dependent files to be used for refreshing that are different versions than the two stored dependent files.

If the background application 122 determines that a remaining capacity associated with the file system 116 is below a threshold level, the background application 122 may delete at least one file from the file system 116 based on an oldest timestamp associated with the file and/or a smallest access count associated with the file. For example, if the file system 116 has stored files that require 90% of the capacity for the file system 116, the background application 122 may begin deleting files based on the file with the oldest timestamp, which indicates that the file was initially stored the longest time ago out of all the stored files. In another example, the background application 122 may begin deleting files based on the file with the smallest access count, which indicates that the file was accessed the least frequently out of all the stored files.

If the background application 122 determines that more than a specified amount of time has passed since a stored file was provided for presentation, the background application 122 may delete the stored file. For example, if the background application 122 determines that more than a week has passed since a stored file was provided for presentation, the background application 122 deletes the stored file.

The background application 122 may store a set of user selections with storage information in the file system 116 and provide the set of user selections to the server 108. For example, if a mobile device user who lives in New York City and vacations in south Florida selects to receive weather updates for New York and Miami from a weather news web page, the background application 122 may store the weather selections of New York and Miami on the server 108. Other examples of user settings may include favorite sports teams that the user selects for receiving sports news updates. If the background application 122 determines that the set of user selections is absent from the mobile device 102, the background application 122 may retrieve the set of user selections from the server 108 and restore the set of user selections on the mobile device 102. A mobile device user may replace the mobile device 102 with another mobile device 102 because of damage to the mobile device 102, losing the mobile device 102, or upgrading to another mobile device 102. In these situations, the client application 112 on the other mobile device 102 may determine that the user settings are absent from the mobile device 102, and retrieve the user settings from the server 108 to provide the user with the same services provided by the initial mobile device 102 without the user having to reenter all previous user selections. The background application 122 may store the set of user selections in the file system 116 with storage information that indicates the user selections are not to be deleted or refreshed, such as a lifespan amount that specifies an unlimited amount of time for the set of user selections to be stored in the file system 116 and/or a refresh selection that specifies to retain indefinitely. The server 108 may analyze the set of user selections provided to the server 108 to create a user profile associated with the mobile device 102. For example, the server 108 analyzes the user selections of New York and Miami for weather updates to create a user profile that advertisement providers may use to send advertisements to the mobile device 102 for flights between New York and Miami.

The background application 122 uses the relationship index to determine whether to delete files stored in the file system 116, and may delete entries from the relationship index and the file system 116 accordingly. Alternatively, another application, such as the client application 112, may delete entries from the file index and files from the file system 116 based on the entries deleted by the background application 122 from the relationship index. If the background application 122 determines that an entry in the relationship index is absent from the file index, the background application 122 may infer that the entry was mistakenly deleted from the file index, and add the entry from the relationship index to the file index. Therefore, the background application 122 may use the information in the relationship index to correct for inadvertent deletions from the file index.

Likewise, if the background application 122 determines that a specific file listed as an entry in the relationship index is absent from the file system 116, the background application 122 may infer that the entry was mistakenly deleted from the file system 116. In response, the background application 122 may retrieve the specific file via the over-the-air communication and the communication component 114, and store the specific file in the file system 116. Therefore, the background application 122 may use the information in the relationship index to correct for inadvertent deletions from the file system 116.

The background application 122 can maintain updated files and delete unwanted files by refreshing stored files that should be refreshed and deleting stored files that should be deleted. By processing dependent files separately from their parent files, the background application 122 may not need to parse the parent files to determine which dependent files to refresh or delete, thereby quickly managing files.

Figure 2:
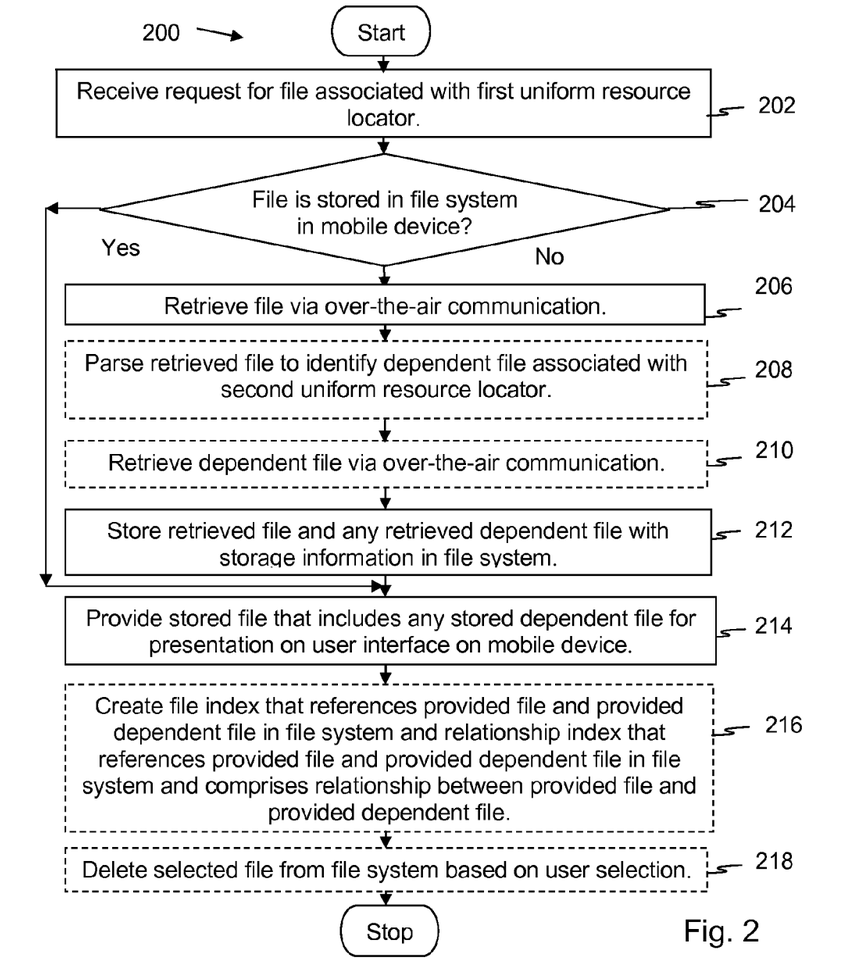
FIG. 2 is a flowchart of a method for mobile device file management according to some embodiments of the present disclosure.

FIG. 2 shows a flowchart of a method 200 for mobile device file management according to some embodiments of the present disclosure. The system 100 can execute the method 200 to retrieve, store, and provide requested files.

In box 202, a request is received for a file associated with a first file identifier, for example a uniform resource locator. For example, the client application 112 receives a request for a file for the web page that includes static information about the television news program.

In box 204, a determination is made whether a file is stored in a file system in a mobile device. For example, the client application 112 determines whether the file for the television news program is stored in the file system 116. If the file is stored in the file system 116, the method 200 proceeds to box 214. If the file is not stored in the file system 116, the method continues to box 206.

In box 206, a file is retrieved via over-the-air communication. For example, the client application 112 retrieves the file for the television news program via the communication component 114.

In box 208, a retrieved file is optionally parsed to identify a dependent file associated with a second file identifier, for example a uniform resource locator. For example, the client application 112 parses the file for the television news program to identify the dependent file that provides updates of the score of the ongoing basketball game and another dependent file that provides updates of the score of the ongoing baseball game.

In box 210, a dependent file is optionally retrieved via over-the-air communication. For example, the client application 112 retrieves the dependent files that provide updates of the basketball and baseball scores via the communication component 114.

In box 212, a retrieved file and any retrieved dependent file are stored with storage information in a file system. For example, the client application 112 stores the files for the television news program and the sports scores updates with storage information in the file system 116.

In box 214, a stored file that includes any stored dependent files is provided for presentation on a user interface on a mobile device. For example, the client application 112 provides a web page for the television news program that includes the updates of sports scores on the user interface 110.

In box 216, a file index that references a provided file and a provided dependent file in a file system and a relationship index that references the provided file and the provided dependent file in the file system and includes a relationship between the provided file and the provided dependent file are optionally created. For example, the client application 112 creates a file index that references the television news program file and the sports scores update files and a relationship index that also references the television news program file and the sports scores update files in the file system 116. The relationship index also includes a relationship between the television news program file as the parent file and the sports scores update files as the dependent files.

In box 218, a selected file is optionally deleted from a file system based on a user selection. For example, the client application 112 deletes the 50 most recent emails from the file system 116 based on a user selection.

Figure 3:
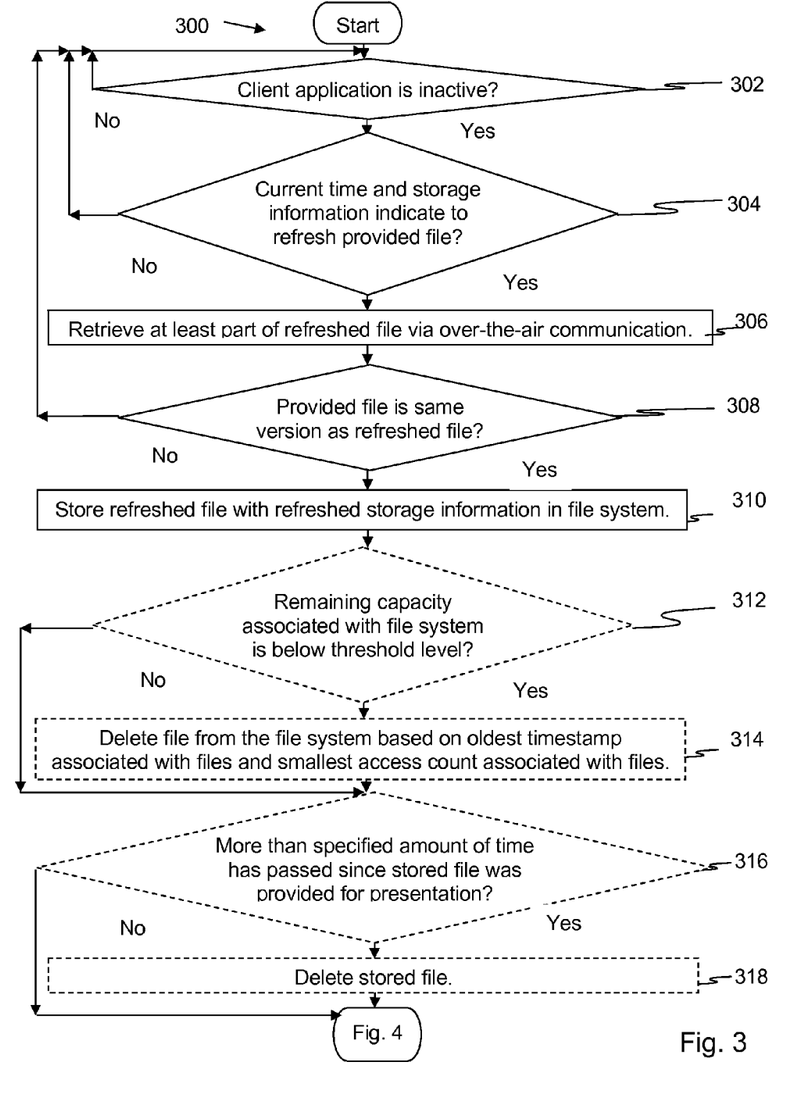
FIG. 3 is a flowchart of another method for mobile device file management according to some embodiments of the present disclosure.

FIG. 3 shows a flowchart of a method 300 for mobile device file management according to some embodiments of the present disclosure. The system 100 can execute the method 300 to manage files in a mobile device file system.

In box 302, a determination is made whether a client application is inactive. For example, the background application 122 determines whether the client application 112 is inactive. If the client application 112 is not inactive, the method 300 returns to box 302 to continue checking until the client application 112 is inactive. If the client application 112 is inactive, the method 300 continues to box 304. In an embodiment, the method 300 may further check whether other applications— for example email, gaming, or other applications—are executing, and wait for idle time to execute the background application 122.

In box 304, a determination is made whether a current time and storage information indicate to refresh a stored file. For example, the background application 122 determines whether the current time and the storage information indicate to refresh the stored file for the television news program. If the current time and the storage information do not indicate to refresh a stored file, the method returns to box 302. If the current time and the storage information indicate to refresh a stored file, the method 300 continues to box 306.

In box 306, at least a part of a refreshed file is retrieved via over-the-air communication. For example, the background application 122 retrieves the meta data for the file for the television news program via the communication component 114.

In box 308, a determination is made whether a stored file is a same version as a refreshed file. For example, the background application 122 determines whether a time stamp in the meta data for each file indicates that the stored file for the television news program is the same version as the refreshed file for the television news program. If the stored file is the same version as the refreshed file, the method 300 returns to box 302. If the stored file is not the same version as the refreshed file, the method continues to box 310.

In box 310, a refreshed file is stored with refreshed storage information in a file system. For example, the background application 122 retrieves and stores the entire refreshed file for the television news program with refreshed storage information in the file system 116.

In box 312, a determination is optionally made whether a remaining capacity associated with a file system is below a threshold level. For example, the background application 122 determines whether the remaining capacity associated with the file system 116 is below 90% of the total capacity. If the remaining capacity associated with the file system 116 is not below the threshold level, the method 300 proceeds to box 316. If the remaining capacity associated with the file system 116 is below the threshold level, the method continues to box 314.

In box 314, a file is optionally deleted from the file system based on an oldest timestamp associated with the files and/or a smallest access count associated with the files. For example, the background application 122 deletes a news article file from the file system 116 because the news article file is the least frequently accessed file among the files in the file system 116.

Figure 4:
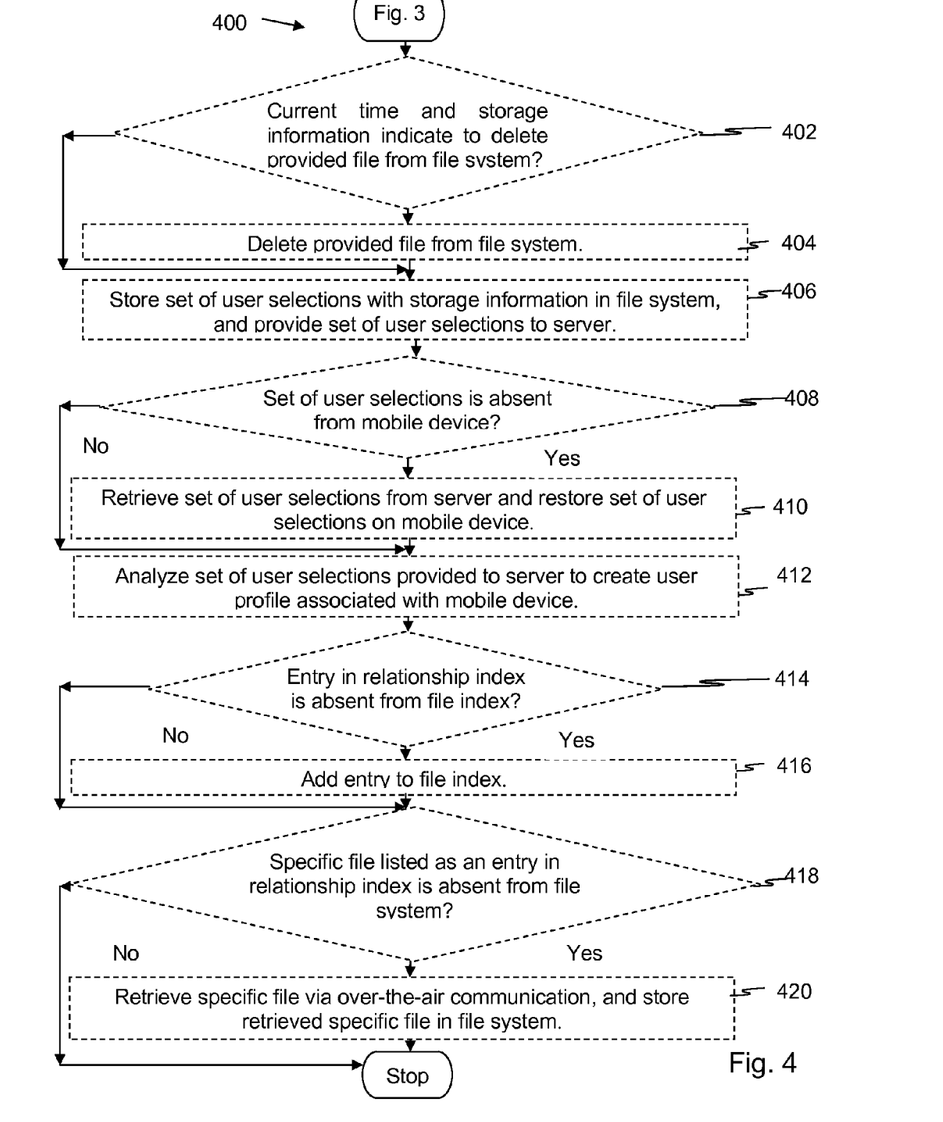
FIG. 4 is a flowchart of yet another method for mobile device file management according to some embodiments of the present disclosure.

In box 316, a determination is optionally made whether more than a specified amount of time has passed since a stored file was provided for presentation. For example, the background application 122 determines whether more than a week has passed since a stored news article file was provided for presentation. If more than a specified amount of time has passed since a stored file was provided for presentation, the method continues to box 318. If more than a specified amount of time has not passed since a stored file was provided for presentation, the method proceeds to box 402 for method 400.

In box 318, a stored file is optionally deleted. For example, the background application 122 deletes the news article file that was stored more than a week ago.

FIG. 4 shows a flowchart of a method 400 for mobile device file management according to some embodiments of the present disclosure. The system 100 can execute the method 400 to manage files in a mobile device file system and to repair the file index and/or the file system.

In box 402, a determination is optionally made whether a current time and storage information indicate to delete a stored file from a file system. For example, the background application 122 determines whether the current time and storage information indicate to delete the file for the television news program from the file system 116. If the current time and storage information indicate to delete a stored file from the file system 116, the method continues to box 404. If the current time and storage information do not indicate to delete a stored file from the file system 116, the method 400 proceeds to box 406.

In box 404, a stored file is optionally deleted from a file system. For example, the background application 122 deletes the entries for the television news program and the dependent files that provide updates of the basketball and baseball scores from the relationship index based on the storage information in the relationship index, and then deletes the files for the television news program and the dependent files that provide updates of the basketball and baseball scores from the file system 116.

In box 406, a set of user selections is optionally stored with storage information in a file system, and the set of user selections is provided to a server. For example, the background application 122 stores the set of user selections for New York and Miami weather updates in the file system 116, and provides the set of user selections to the server 108. In an embodiment, the server 108 may store the set of user selections in a memory and/or in a data store coupled to the server 108.

In box 408, a determination is optionally made whether a set of user selections is absent from a mobile device. For example, the background application 122 determines whether the set of user selections for New York and Miami weather updates is absent from the mobile device 102. If the set of user selections is absent from the mobile device 102, the method continues to box 410. If the set of user selections is not absent from the mobile device 102, the method 400 proceeds to box 412.

In box 410, a set of user selections is optionally retrieved from a server and the set of user selections is restored on a mobile device. For example, the background application 122 retrieves the set of user selections for New York and Miami weather updates from the server 108 and restores the set of user selections that were inadvertently deleted from the mobile device 102.

In box 412, a set of user selections provided to a server is optionally analyzed to create a user profile associated with a mobile device. For example, the server 108 analyzes the set of user selections for New York and Miami weather updates provided to the server 108 to create a user profile associated with the mobile device 102.

In box 414, a determination is optionally made whether an entry in a relationship index is absent from a file index. For example, the background application 122 determines whether the entry for the television news program in the relationship index is absent from the file index. If an entry in the relationship index is absent from the file index, the method 400 continues to box 416. If an entry in the relationship index is not absent from the file index, the method proceeds to box 418.

In box 416, an entry is optionally added to a file index. For example, the background application 122 adds the entry for the television news program in the relationship index to the file index.

In box 418, a determination is optionally made whether a specific file listed as an entry in a relationship index is absent from a file system. For example, the background application 122 determines whether the file for the television news program listed as an entry in the relationship index is absent from the file system 116. If the specific file listed as an entry in the relationship index is absent from the file system 116, the method continues to box 420. If a specific file listed as an entry in the relationship index is not absent from the file system 116, the method 400 terminates.

In box 420, a specific file is optionally retrieved via over-the-air communication, and the retrieved specific file is store in a file system. For example, the background application 122 retrieves the file for the television news program via the communication component 114, and stores the file for the television news program in the file system 116.

Figure 5:
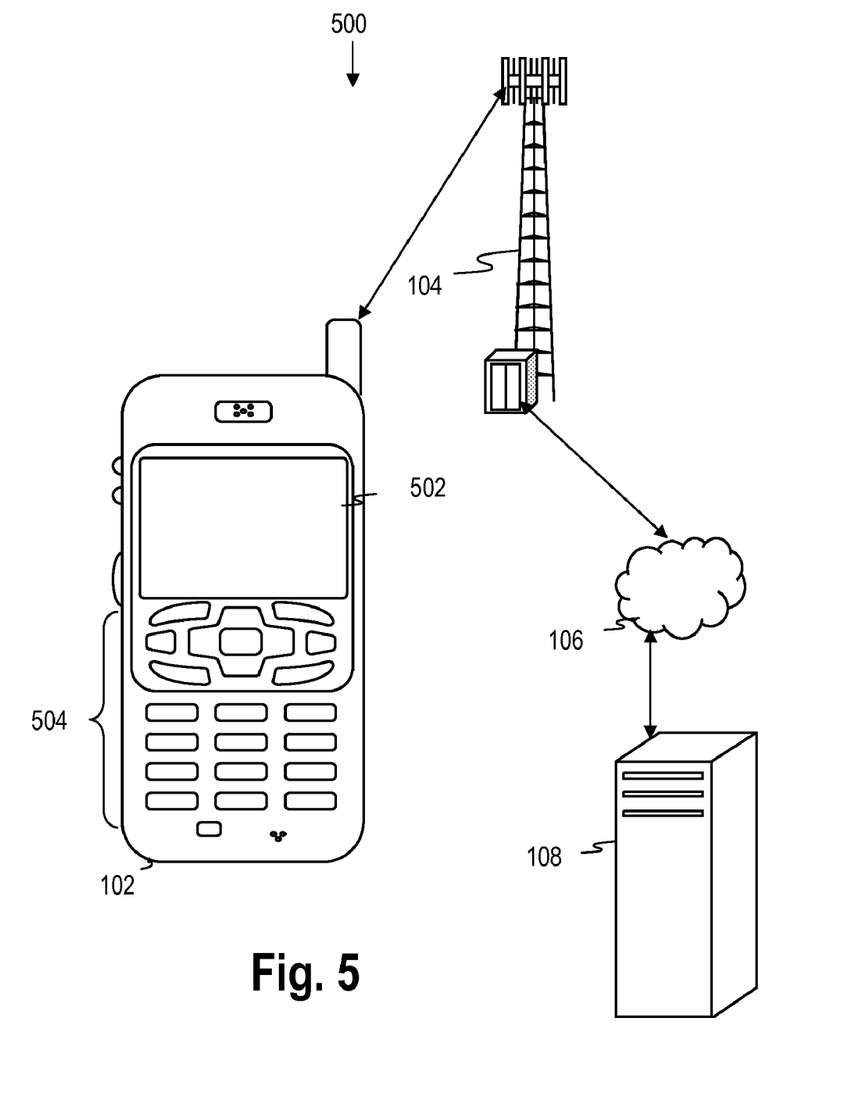
FIG. 5 shows a wireless communications system including an illustrative mobile device.

FIG. 5 shows a wireless communications system 500 including the mobile device 102. FIG. 3 depicts the mobile device 102, which is operable for implementing aspects of the present disclosure, but the present disclosure should not be limited to these implementations. Though illustrated as a mobile phone, the mobile device 102 may take various forms including a personal computer, a mobile telecommunication device, a mobile handset, a personal digital assistant, a mobile computer, a handheld gaming device, a wireless mobile device, a pager, a portable computer, a tablet computer, a laptop computer, a media player, a digital camera, a digital music player, a digital calculator, and/or other. Many suitable communication devices 102 combine some or all of these functions. In some embodiments of the present disclosure, the mobile device 102 may be a special-purpose communications device such as a mobile phone, wireless handset, pager, or PDA. The mobile device 102 may support specialized activities such as gaming, inventory control, job control, and/or task management functions, and so on.

The mobile device 102 includes a display 502 and a touch-sensitive surface or keys 504 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 502 to show a web page. The web page may be obtained via wireless communications with the base transceiver station (BTS) 104, a wireless network access node, a peer mobile device 102 or any other wireless communication network or system. While a single base transceiver station 104 is illustrated, it is understood that the wireless communication system may comprise additional base transceiver stations. In some instances, the mobile device 102 may be in communication with multiple base transceiver stations 104 at the same time. The base transceiver station 104 (or wireless network access node) is coupled to the network 106, such as the Internet. Via the wireless link and the wired network, the mobile device 102 has access to information on various servers, such as the server 108. The server 108 may provide content that may be shown on the display 502. Alternately, the mobile device 102 may access the base transceiver station 104 through a peer mobile device 102 acting as an intermediary, in a relay type or hop type of connection.

Figure 6:
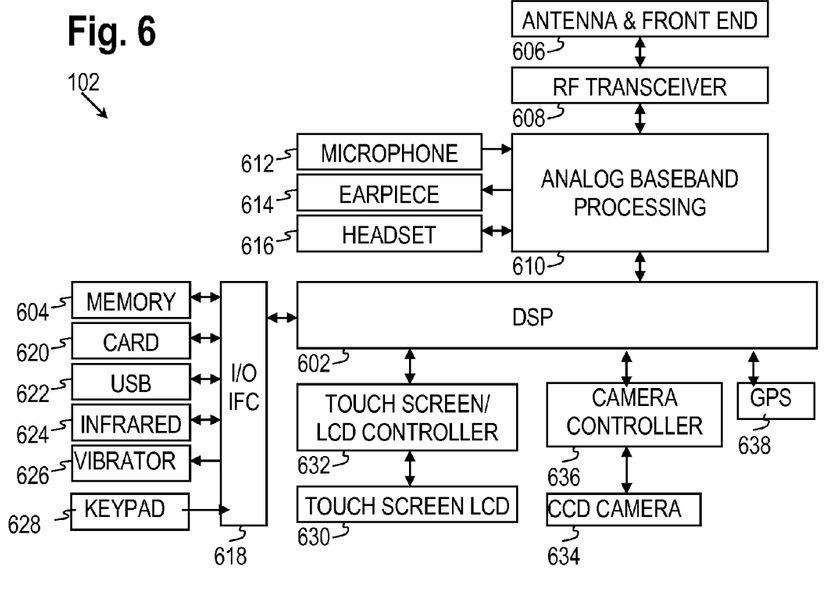
FIG. 6 shows a block diagram of an illustrative mobile device.

FIG. 6 shows a block diagram of the mobile device 102. While a variety of known components of communication devices 102 are depicted, in an embodiment a subset of the listed components and/or additional components not listed may be included in the mobile device 102. The mobile device 102 includes a digital signal processor (DSP) 602 and a memory 604. As shown, the mobile device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the mobile device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the mobile device 102 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the mobile device 102 to send and receive information from a radio access network (RAN) or some other available wireless communications network or from a peer mobile device 102. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF transceiver 608, portions of the antenna and front end 606, and the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset port 616 and outputs to the earpiece speaker 614 and the headset port 616. To that end, the analog baseband processing unit 610 may have ports for connecting to the built-in microphone 612 and the earpiece speaker 614 that enable the mobile device 102 to be used as a mobile phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast Fourier transforming, and cyclic prefix appending, and for a receiver function the DSP 602 may perform cyclic prefix removal, fast Fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 102 to function as a peripheral device to exchange information with a personal computer or other computer system. The infrared port 624 and other optional ports such as a Bluetooth interface or an IEEE 802.11 compliant wireless interface may enable the mobile device 102 to communicate wirelessly with other nearby communication devices 102 and/or wireless base stations.

The input/output interface 618 may further connect the DSP 602 to the vibrator 626 that, when triggered, causes the mobile device 102 to vibrate. The vibrator 626 may serve as a mechanism for silently alerting the user to any of various events such as an incoming call, a new text message, and an appointment reminder.

The keypad 628 couples to the DSP 602 via the interface 618 to provide one mechanism for the user to make selections, enter information, and otherwise provide input to the mobile device 102. Another input mechanism may be the touch screen LCD 630, which may also display text and/or graphics to the user. The touch screen LCD controller 632 couples the DSP 602 to the touch screen LCD 630.

The CCD camera 634 enables the mobile device 102 to take digital pictures. The DSP 602 communicates with the CCD camera 634 via the camera controller 636. The GPS sensor 638 is coupled to the DSP 602 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 7:
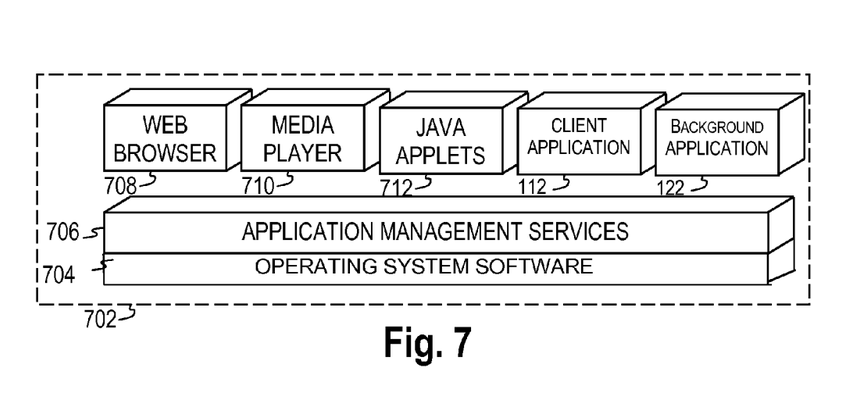
FIG. 7 shows a block diagram of an illustrative software configuration for a mobile device.

FIG. 7 illustrates a software environment 702 that may be implemented by the DSP 602. The DSP 602 executes operating system drivers 704 that provide a platform from which the rest of the software operates. The operating system drivers 704 provide drivers for the mobile device hardware with standardized interfaces that are accessible to application software. The operating system drivers 704 include application management services ("AMS") 706 that transfer control between applications running on the mobile device 102. Also shown in FIG. 7 are a web browser application 708, a media player application 710, JAVA applets 712, the client application 112, and the background application 122. The web browser application 708 configures the mobile device 102 to operate as a web browser, allowing a user to enter information into forms and select links to retrieve and view web pages. The media player application 710 configures the mobile device 102 to retrieve and play audio or audiovisual media. The JAVA applets 712 configure the mobile device 102 to provide games, utilities, and other functionality.

Figure 8:
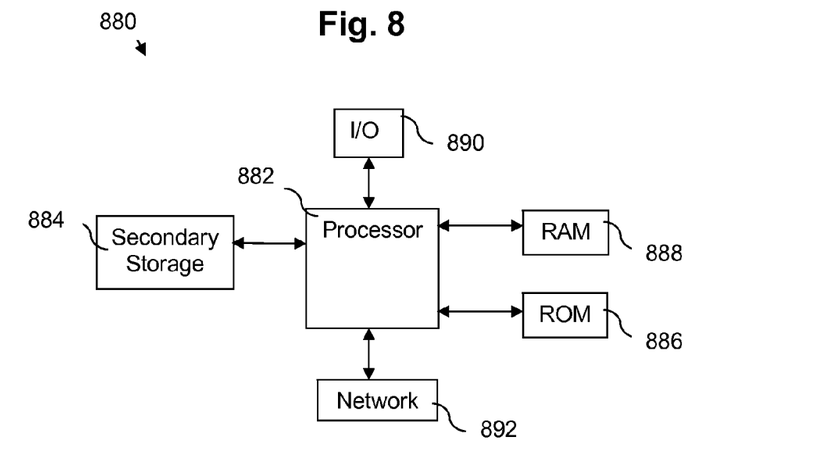
FIG. 8 illustrates an exemplary computer system suitable for implementing some aspects of the several embodiments of the disclosure.

Some aspects of the system described above may be implemented on a computer with sufficient processing power, memory resources, and network throughput capability to handle the necessary workload placed upon it. FIG. 8 illustrates a typical computer system suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data in part by directly accessing the computer program product, for example by reading from a CD-ROM disk inserted into a disk drive peripheral of the computer system 880. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A system for mobile device file management, comprising:
 a processor on a mobile device;
 a client application that, when executed by the processor, receives a request for a file associated with a first file identifier, determines whether the file is stored in a file system in the mobile device, retrieves the file via over-the-air communication in response to a determination that the file is not stored in the file system, parses the retrieved file to identify a dependent file associated with a second file identifier, retrieves the dependent file via over-the-air communication, stores the retrieved file and the retrieved dependent file with storage information in the file system, provides the stored file that comprises the stored dependent file for presentation on a user interface on the mobile device, and creates a file index that references the provided file and the provided dependent file in the file system and a relationship index that references the provided file and the provided dependent file in the file system and comprises a relationship between the provided file and the provided dependent file; and
 a background application that, when executed by the processor, determines whether the client application is inactive, determines whether a current time and the storage information indicate to delete the provided file in response to a determination that the client application is inactive, deletes the provided file from the relationship index in response to a determination that the current time and the storage information indicate to delete the provided file from the file system, deletes any files absent from the relationship index from the file index and the file system, determines whether an entry in the relationship index is absent from the file index and adds the entry to the file index in response to a determination that the entry in the relationship index is absent from the file index, determines whether a specific file listed as an entry in the relationship index is absent from the file system, retrieves the specific file via over-the-air communication and a communication component in response to a determination that the file listed as the entry in the relationship index is absent from the file system, and stores the retrieved specific file in the file system.

2. The system of claim 1, wherein the background application further determines whether the current time and the storage information indicate to refresh the provided file in response to the determination that the client application is inactive, retrieves at least a part of a refreshed file and a refreshed dependent file via over-the-air communication in response to a determination that the current time and the storage information indicate to refresh the provided file, determines whether the provided file is a same version as the refreshed file and the refreshed dependent file, and stores the refreshed file and the refreshed dependent file with refreshed storage information in the file system in response to a determination that the provided file is not the same version as the refreshed file and the refreshed dependent file.

3. The system of claim 1, wherein the background application one of retrieves the refreshed file and the refreshed dependent file via over-the-air communication and a communication component based on accessing the relationship index and deletes the provided file and the provided dependent file in the file system based on accessing the relationship index.

4. The system of claim 1, wherein the client application further deletes a selected file from the file system based on a user selection.

5. The system of claim 1, wherein the first file identifier and the second file identifier are one of uniform resource locators (URLs), references to a file, addresses of a file, and names of a file.

* * * * *